United States Patent Office

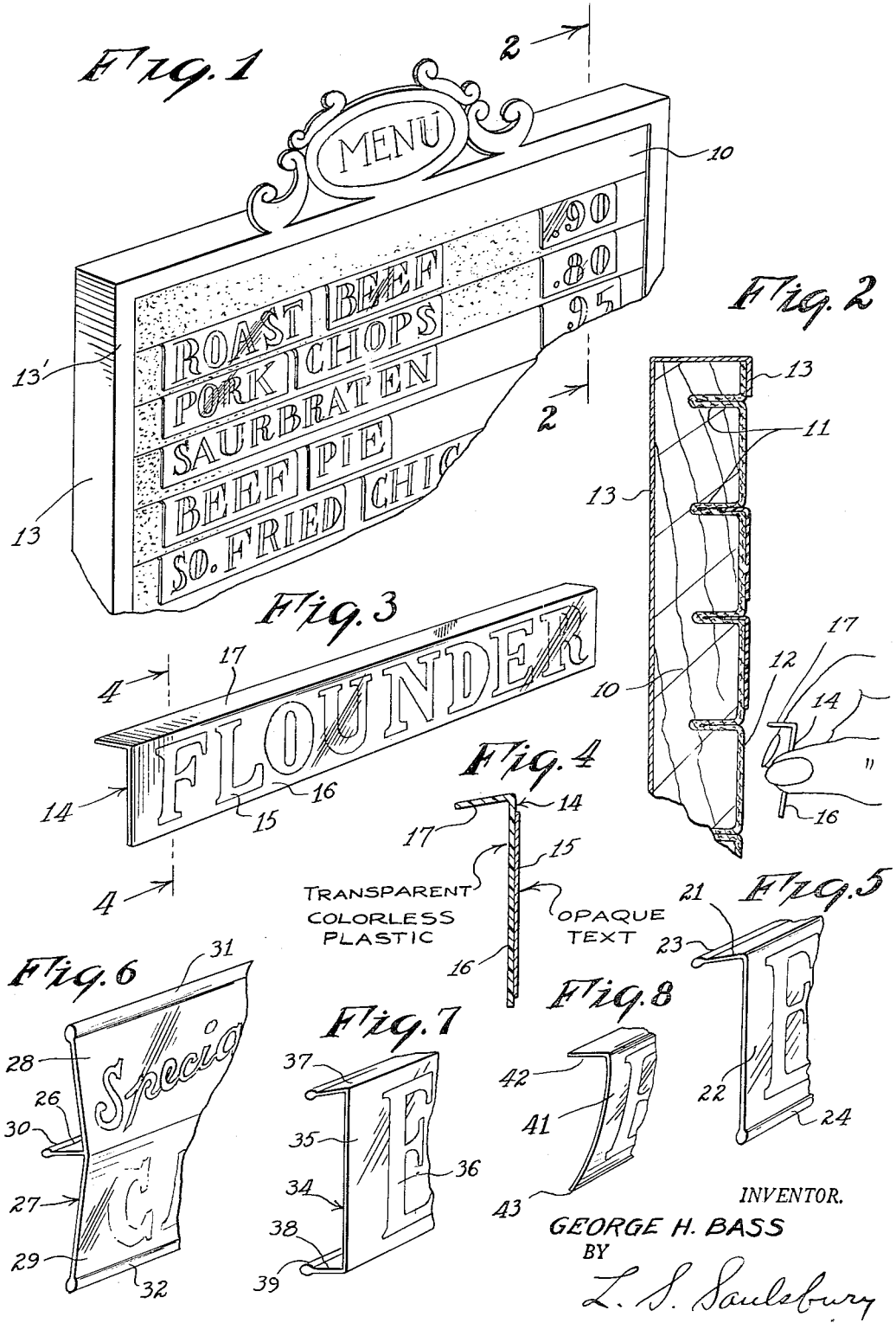

2,746,189
Patented May 22, 1956

2,746,189
BULLETIN BOARD WORD ELEMENTS
George H. Bass, New York, N. Y.

Application June 26, 1952, Serial No. 295,655

1 Claim. (Cl. 40—143)

This invention relates to display or menu bulletin boards having replaceable word elements.

It is an object of the present invention to provide in a display or bulletin board of the type having replaceable word or letter elements, elements made up into complete words with the letters being opaque and the portion on which the letters are placed being transparent so that the colored backing of the board will be viewed through the transparent element and the opaque letters thereon thereby made to stand out clearly to the observer.

It is another object of the invention to provide a display or menu bulletin board having lettering elements of full words and with a single long attaching portion running on one edge at less than ninety degrees from the rear face of the word portion and adapted to enter a slot to tightly fit the same, whereby the lower edge of the word portion will be brought tightly against the face of the bulletin board.

It is another object of the invention to provide replaceable letter or word elements for display or menu bulletin boards having enlarged edge formations engageable with the felt on the front of the bulletin board which are rounded and smooth to prevent injury to the felt material as the elements are applied or removed from the bulletin board.

Other objects of the invention are to provide word or letter elements for display or menu bulletin boards having the above objects in mind, which are of simple construction, inexpensive to manufacture, easy to apply upon and remove from the bulletin board, light in weight, saves time and labor in making up the bulletin board, adapted to be made of transparent plastic, easy to observe the letters, keeps uniform spacing of the letters and of pleasing appearance.

For other objects and for a better understanding of the invention reference may be had to the following detailed description taken in connection with the accompanying drawing in which:

Figure 1 is a fragmentary perspective view of the top portion of the menu bulletin board having the word elements of the present invention fixed in the slots thereof;

Fig. 2 is a fragmentary vertical sectional view of the bulletin board illustrating the manner in which the word elements are applied to the board, the view being taken on line 2—2 of Fig. 1;

Fig. 3 is a perspective view of one of the word elements made according to one form of the invention;

Fig. 4 is an enlarged vertical sectional view taken on line 4—4 of Fig. 3 of the word element;

Fig. 5 is a fragmentary perspective view of a modified form of the invention wherein the portions of the element have rounded edges to prevent injury to the felt facing of the bulletin board;

Fig. 6 is a fragmentary perspective view of a still further form of the invention wherein there are word portions having upper and lower sections which extend from a single attaching portion and with the edges of the portions being rounded to prevent injury to the felt facing;

Fig. 7 is a fragmentary perspective view of a still further form of the invention wherein there are two attaching portions extending from the opposite edges of the word portion and adapted to enter respectively two slots of the bulletin board;

Fig. 8 is a perspective view of a still further form of the invention wherein the word portion is angled and curved under the attaching portion.

Referring now particularly to Figs. 1 to 4, 10 represents a bulletin board backing of wood having a plurality of vertically spaced horizontal slots 11 into which felt facing material 12 is folded and extended. This felt material is usually black in color and will extend over the full front face of the bulletin board backing 10. A frame or molding strip 13 usually of stainless steel, is extended around the sides of the board. This frame or molding strip has a front flange 13' which extends over the side edges of the board 10 to retain the felt material thereon and cover the edges thereof.

Adapted to fit and be retained in the slots 11 and between the folded felt material thereon are word elements 14 having letters 15 formed of opaque material and on the front face of a word portion 16. Extending from one edge of the transparent word portion 16 is an attaching portion or flange 17 which enters the slot 11 and applies in the manner as illustrated in Fig. 2. This element is made of transparent colorless plastic which can be formed of sheet strip folded with the flange or attaching portion 17 folded or bent to a position at an angle less than ninety degrees from the word portion 16 as shown clearly in Fig. 4.

With this flange or attaching portion 17 being angled from the word portion 16 in this manner the lower edge of the word portion will be brought tightly against the felt material and will not turn or curl up. The attaching portion 17 enters the slot which is normal to the front face of the board and accordingly the word portion 16 will have its lower edge just strike the front face of the board and as pressure is applied to insert the attaching portion 17 to its full extent, the attaching portion 17 will have a tendency to be angled in the slot 11 and the word portion 16 will be stressed in a manner to bring the lower edge tight against the board facing and thereby to insure flush engagement with the front face of the board. With this element there will be no curling up of the lower edge of the word portion 16 and the letters 15 will always be visible and evenly aligned with the board face. The felt material is usually black and since the word portion 16 of the element is transparent any white or opaque letters 15 will clearly stand out and thus be easily observed.

In Fig. 5, there is shown a modified form of the invention wherein attaching portion 21 is still angled with respect to a word backing portion 22 less than 90 degrees so that the lower edge of the word portion 22 is kept tight against the front face of the bulletin board. The attaching portion 21, however, is provided with an enlarged and rounded edge portion 23 which will slide freely into the slot and over the felt material 12 without injury thereto. When the attaching portion 21 is fully inserted in the slot 11, the word portion 22 is put under tension and its lower edge will be urged toward the face of the board. This lower edge is provided with a rounded formation or enlargement 24 for the same purpose as the formation 23 is used on the attaching portion 21. The element shown in Fig. 5 will be inserted in the same manner that the element 14 is inserted and as illustrated in Fig. 2.

In Fig. 6, there is shown a still further form of the invention wherein the attaching portion, as indicated at 26 is disposed in the middle of the word portion. The word portion is indicated generally at 27 and is provided with two sections 28 and 29, with the section 28 being above the section 29. The attaching portion 26 has an enlargement or rounded edge 30 and the sections 28 and 29 of the word portion 27 are respectively angled with respect to the attaching portion at less than 90 degrees. Accordingly, when the attaching portion 26 is inserted in a slot the center of the word portion will be placed under tension and the edges of the sections 28 and 29 will be brought tightly against the front of the bulletin board. The section 28 has an enlargement 31 running along its free edge that is rounded to prevent injury to the felt material. The section 29 has a similar enlargement 32 running along its edge for the same purpose. It will be seen that with this form of the invention, like with the other forms of the invention which have already been described, that the edges of the word portions are held firmly against the board surface.

In Fig. 7 there is shown a still further form of the invention wherein two attaching portions are used for the connection of the word elements to the bulletin board. This word element is indicated at 34 and includes a word or backing portion 35 having opaque letters 36 and from the upper and lower edges of the word portion 35 there extends inwardly attaching portions 37 and 38. The attaching portion 37 is angled with respect to the backing portion 35 to less than 90 degrees in the same manner as is the attaching portion of the other forms of the invention. In order to have the full effect of this angle attaching portion, the attaching portion extends from the word portion 35 at 90 degrees. It will be seen that the attaching portion 37 tends to keep the word portion 35 tight against the surface of the bulletin board and enlargement 39 of the portion 38 will have a tendency to be tight in the slot and will be held by the felt material. It will thus be seen that the word element 34 will be adequately and tightly gripped between two slots of the bulletin board.

In Fig. 8 there is shown a still further form of the invention wherein the word or backing portion is angled relative to the attaching portion. The word portion is indicated at 41 and the attaching portion is indicated a 42. The word portion 41 is curved and inclined rearwardly so that as the attaching portion 42 is inserted straight into the slot, lower edge 43 of the word portion 41 will be forced outwardly and be put under tension relative to the attaching portion 42 thereby causing the attaching portion 42 to be slighly angled in the slot to give good gripping engagement therewith. This word element is formed of flexible transparent plastic and will return to its original shape when the element is removed from the bulletin board.

It should now be apparent that there has been provided a display or menu bulletin board of the type having replacement word elements which are transparent and on which there are opaqe letters. The transparent plastic permits the felt backing to be used as a background for the letters and at the same time permits and makes easy forming of the data or menu on the bulletin board in a quick and effective manner. It will also be apparent that where the word elements being formed in the manner as set forth with the attaching portions being angled relative to the word portions that a more adequate and effective gripping of the elements is had with the insertion of the inserted elements in the slots of the bulletin board. It will also be seen that the edges of the attaching and word portions have been rounded in a manner such as to give better gripping engagement and at the same time to keep the felt material from being injured by the edges of the element.

While various changes may be made in the detail construction, it shall be understood that such changes shall be within the spirit and scope of the present invention, as defined by the appended claims.

What is claimed is:

A display element for use on slot type display or bulletin boards comprising a transparent backing portion having opaque letter or other formations thereon, an attaching portion extending at an angle from one edge thereof and adapted to enter the slots of the bulletin board to be retained in place thereon, and said backing portion being formed of two sections above and below the attaching portion and these two sections being respectively extended at an angle less than ninety degrees from the attaching portion, and enlarged and rounded formations being provided respectively on the free edges of the backing portion sections and of the attaching portion.

References Cited in the file of this patent

UNITED STATES PATENTS

| | | |
|---|---|---|
| 1,079,372 | Spielmann | Nov. 25, 1913 |
| 1,163,750 | Grant | Dec. 14, 1915 |
| 1,207,711 | Clark | Dec. 12, 1916 |
| 1,452,074 | Evens | Apr. 17, 1923 |
| 2,609,204 | Wixson | Sept. 2, 1952 |